United States Patent
Tazzari et al.

(10) Patent No.: US 10,606,691 B2
(45) Date of Patent: Mar. 31, 2020

(54) METHOD FOR RECOGNIZING THE COMMUNICATION PROTOCOL OF DATA PACKETS TRAVELLING OVER A COMMUNICATION BUS

(71) Applicant: ABB Schweiz AG, Baden (CH)

(72) Inventors: Davide Tazzari, Loro Ciuffenna (IT); Filippo Vernia, La Spezia (IT)

(73) Assignee: ABB Schweiz AG, Baden (CH)

( * ) Notice: Subject to any disclaimer, the term of this patent is extended or adjusted under 35 U.S.C. 154(b) by 213 days.

(21) Appl. No.: 15/888,988

(22) Filed: Feb. 5, 2018

(65) Prior Publication Data
US 2018/0225170 A1 Aug. 9, 2018

(30) Foreign Application Priority Data

Feb. 3, 2017 (EP) .................................. 17154572

(51) Int. Cl.
*G06F 11/00* (2006.01)
*G06F 11/10* (2006.01)
*H04L 12/40* (2006.01)
*H04L 29/06* (2006.01)
*H04L 29/08* (2006.01)
*G06F 13/42* (2006.01)

(52) U.S. Cl.
CPC .......... *G06F 11/1004* (2013.01); *G06F 13/42* (2013.01); *H04L 12/40* (2013.01); *H04L 12/40071* (2013.01); *H04L 67/025* (2013.01); *H04L 67/141* (2013.01); *H04L 69/22* (2013.01); *H04L 12/40078* (2013.01)

(58) Field of Classification Search
CPC ...... G06F 11/1004; G06F 13/42; H04L 12/40; H04L 12/40071; H04L 69/18
See application file for complete search history.

(56) References Cited

U.S. PATENT DOCUMENTS 6,105,068 A 8/2000 Naudus
6,157,641 A 12/2000 Wilford
(Continued)

FOREIGN PATENT DOCUMENTS

WO 2016060825 A1 4/2016

OTHER PUBLICATIONS

European Patent Office, Extended Search Report issued in corresponding Application No. 17154572.6, dated May 17, 2017, 7 pp.

*Primary Examiner* — Philip Guyton
(74) *Attorney, Agent, or Firm* — J. Bruce Schelkopf; Taft Stettinius & Hollister LLP

(57) ABSTRACT

A method for recognising a communication protocol of data packets travelling over a communication bus. The method comprises a CRC check procedure for processing a data packet travelling over the communication bus, the CRC check procedure including: calculating a first checksum string by processing the payload portion of the data packet, according to a first CRC-generation engine associated to the first communication protocol; calculating a second checksum string by processing the payload portion of the data packet, according to a second CRC-generation engine associated to the second communication protocol; and comparing with the first and second checksum strings with the CRC portion of the data packet.

22 Claims, 3 Drawing Sheets

(56) References Cited

U.S. PATENT DOCUMENTS

Figure 1:
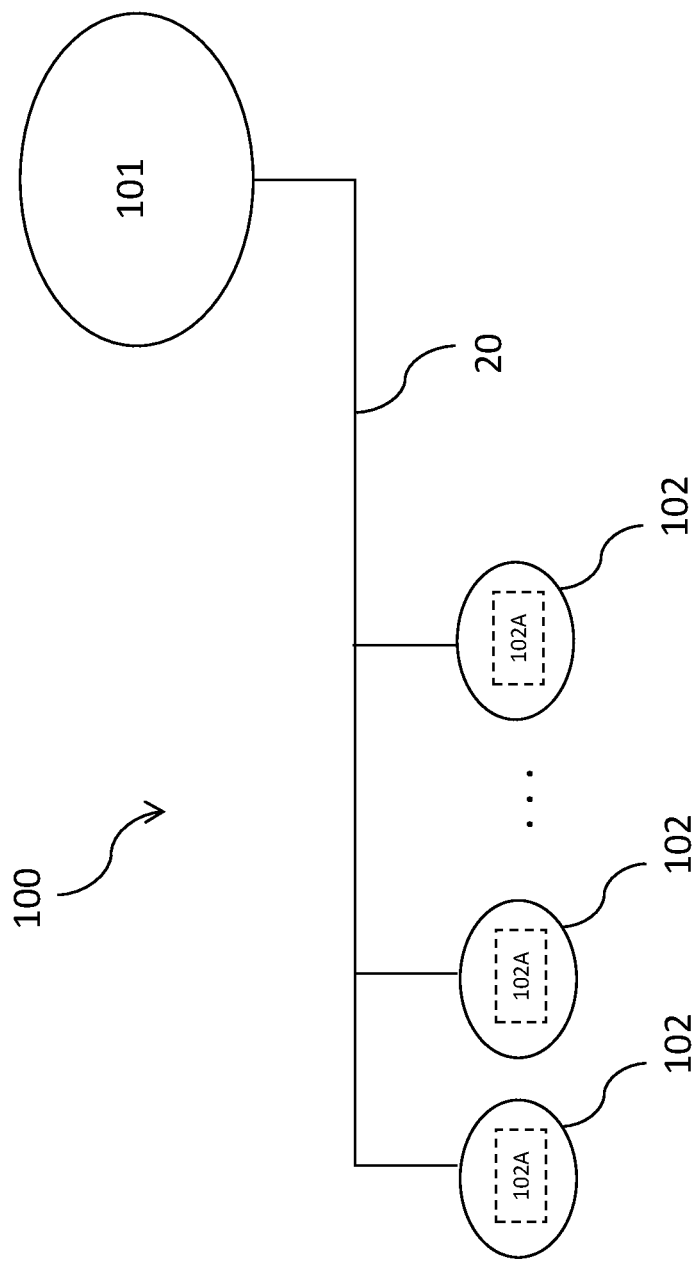

2003/0056043 A1\* 3/2003 Kostadinov ....... H04L 12/40032
710/104
2016/0087825 A1 3/2016 Tian et al.
2017/0030736 A1\* 2/2017 Yang ...................... G01D 4/002

\* cited by examiner

METHOD FOR RECOGNIZING THE COMMUNICATION PROTOCOL OF DATA PACKETS TRAVELLING OVER A COMMUNICATION BUS

The present invention relates to a method for recognising a communication protocol of data packets travelling over a communication bus.

The method, according to the invention, is particularly suitable for implementation in a photovoltaic plant.

The method, according to the invention, may however be implemented in any plant (e.g. in an electric vehicle charging plant or in an electric power distribution plant), in which a number of field devices, which are configured to operate as slave devices, are put in communication through a communication bus with a remote computerised device, which is configured to operate as a master device.

As is known, many photovoltaic plants are provided with remote communication capabilities for a remote monitoring or management of their performances.

Photovoltaic plants of this type normally comprise a number of field devices communicating with a remote device through a dedicated communication bus.

Said field devices may include, for example, electronic controllers on-board the photovoltaic inverters and other electronic devices (such as sensors, protection devices, meters, actuators, weather stations, and so on) equipped with signal processing resources (e.g. a microprocessor) to perform their functionalities.

Said remote device may comprise, for example, a data logger, a gateway, a remote controller, a computer server, and so on.

As is known, many existing photovoltaic plants employ proprietary communication protocols for implementing the above-described remote communication capabilities. An example of said proprietary communication protocols is represented by the Aurora™ communication protocol.

On the other hand, in the market, there is an increasingly strong interest for employing open communication protocols for implementing the above-described remote communication capabilities. An example of said open communication protocols is represented by the Modbus™ communication protocol.

Typically, said proprietary and open communication protocols are characterised by a different structure and time synchronization of the data packets to be exchanged over a communication bus.

As an example, a very important differentiating feature may consist in that a proprietary communication protocol provides for data packets having a fixed length whereas an open communication protocol provides for data packets having a variable length.

As a consequence of the above, protocol conflicts may arise when (e.g. for retrofitting purposes) an existing photovoltaic plant, which includes field devices employing a proprietary communication protocol, is equipped with new field devices normally employing an open communication protocol or is linked with a remote device normally employing an open communication protocol.

In these cases, there is often the need for set-up sessions to properly configure the field devices of the photovoltaic plant in order to ensure their correct operation.

Such set-up sessions may be quite time-consuming as a photovoltaic plant may include a huge number of field devices (e.g. in the order of hundreds or thousands) to be configured. In addition, these set-up sessions often require a manual intervention on the user interface of the field devices to be configured by an operator.

Due to the intrinsic complexity of said set-up sessions, errors in configuring the field devices may frequently occur. Unfortunately, such configuration errors are generally quite difficult to check out and prevent as they typically emerge only when the field devices start operating.

Thus, specific maintenance interventions are often needed to correct said configuration errors with consequent increase of the operative costs of the photovoltaic plant.

As it can be easily understood from the above, in the market it is quite felt the need for solutions that allow solving or mitigating the technical problems evidenced above.

In order to respond to this need, the present invention provides a method for recognising a communication protocol, according to the following claim 1 and the related dependent claims.

In a further aspect, the present invention relates to a computer program, according to the following claim 12.

In a further aspect, the present invention relates to a field device for a plant, according to the following claim 13 and the related dependent claims.

In yet a further aspect, the present invention relates to a plant, according to the following claim 15.

In a general definition, the method, according to the invention, provides for processing data packets travelling over a communication bus, which are transmitted according to a first communication protocol or according to a second communication protocol and include at least a payload portion and a CRC portion.

The method, according to the invention, comprises at least a CRC check procedure for processing data packets travelling over said communication bus.

Said CRC check procedure comprises:
- calculating a first checksum string by processing the payload portion of a data packet, according to a first CRC-generation engine associated to said first communication protocol;
- calculating a second checksum string by processing the payload portion of said data packet, according to a second CRC-generation engine associated to said second communication protocol;
- comparing with said first and second checksum strings with the CRC portion of said data packet.

Preferably, said first communication protocol is an Aurora™ communication protocol or a related legacy protocol.

Preferably, said second communication protocol is a Modbus™ communication protocol or a related legacy protocol.

Figure 2:
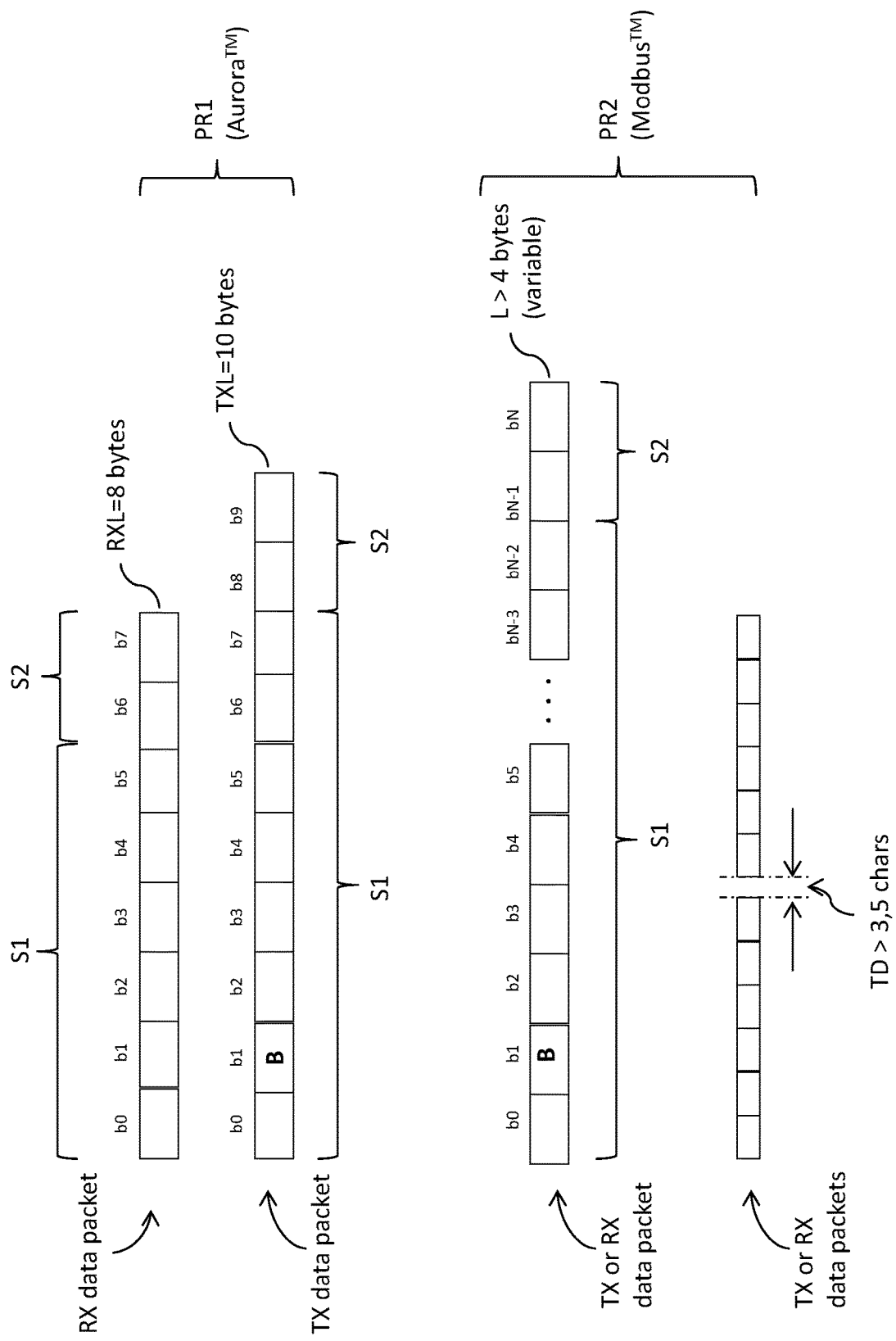
Figure 3:
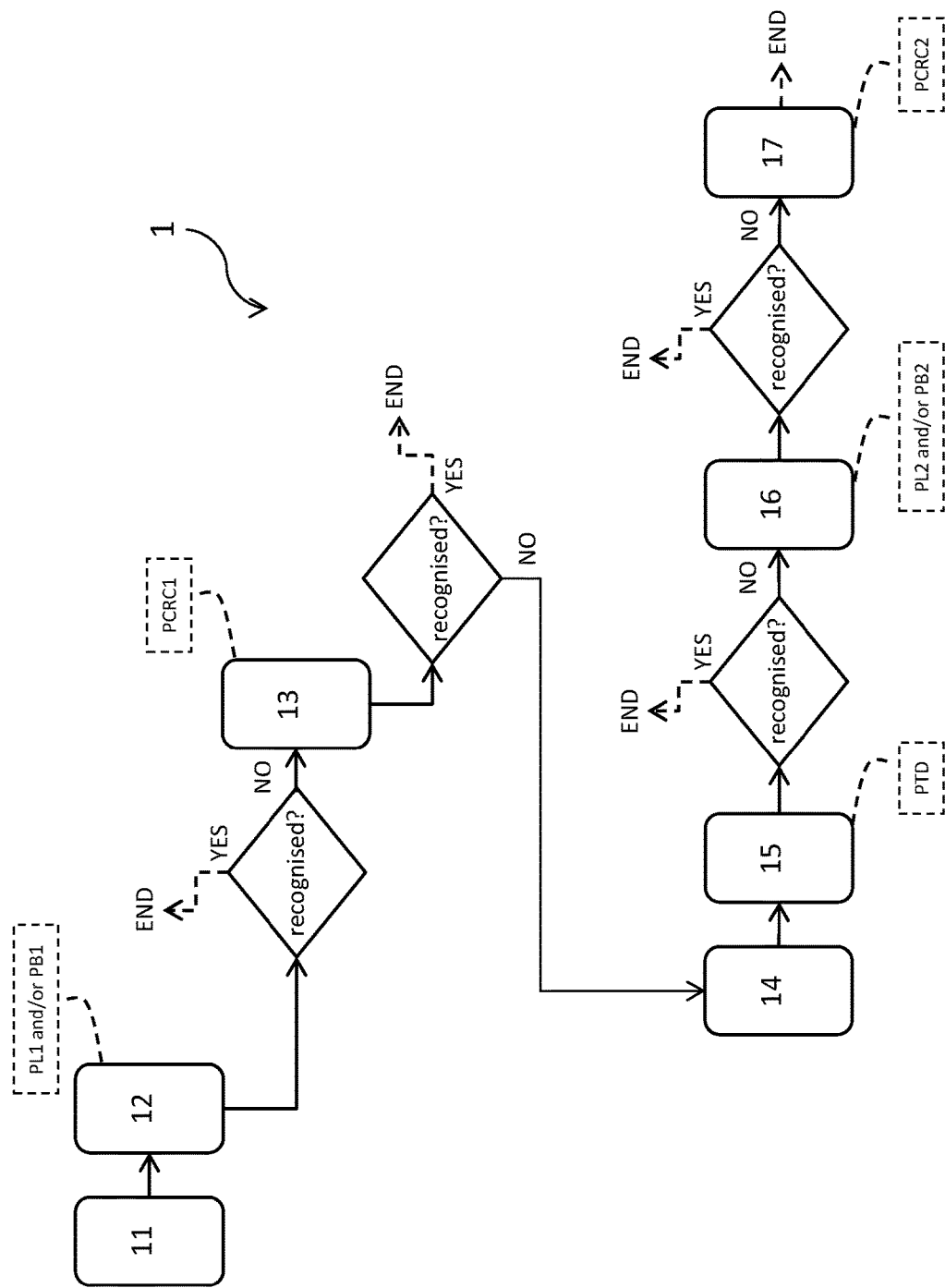

Further characteristics and advantages of the present invention shall emerge more clearly from the description of preferred but not exclusive embodiments illustrated purely by way of example and without limitation in the attached drawings, in which:

FIG. 1 schematically illustrates a plant including one or more field devices, according to the invention;

FIGS. 2-3 schematically illustrate the method, according to the invention.

With reference to the mentioned figures, the present invention relates to a method 1 for recognising a communication protocol of data packets travelling over a communication bus 20.

The communication bus 20 is a serial communication bus adapted to link a master device 101 with one or more slave devices 102 (FIG. 1).

Data packets travelling over the communication bus 20 may be transmitted by the master device 101 (TX data packets) or by the slave devices 102 (RX data packets).

Data packets travelling over the communication bus 20 may be transmitted by the master device 101 or by the slave devices 102 according to a first master-slave communication protocol PR1 or according to a second master-slave communication protocol PR2.

Preferably, the first communication protocol PR1 is an Aurora™ communication protocol or a related legacy protocol.

Preferably, the second communication protocol PR2 is a Modbus™ communication protocol or a related legacy protocol.

In general, data packets travelling over the communication bus 20 (according to one of the communication protocols PR1, PR2) include one or more CRC (Cyclic Redundancy Check) bytes. Said data packets thus include a payload portion S1 and a CRC portion S2 (FIG. 2).

As an example, a data packet according to the Aurora™ communication protocol includes a payload portion having a fixed number of bytes (e.g. 6 bytes in RX data packet and 8 bytes in TX data packet) and a CRC portion including the last two bytes of said data packet.

As a further example, a data packet according to the Modbus™ communication protocol includes a payload portion having a variable number of bytes (from 0 to 252) and a CRC portion including the last two bytes of said data packet.

According to the invention, data packets travelling over the communication bus 20, which are provided according to the first communication protocol PR1, have a first structure including specific features in accordance with the communication protocol PR1.

One of said specific features consists in that data packets provided according to the communication protocol PR1 have fixed lengths, when they are transmitted by the master device 101 or by the slave devices 10.

Thus, TX data packets and RX data packets, when transmitted according to the first communication protocol PR1, have respectively a fixed TX length value TXL and a fixed RX length value RXL, which are characteristic of the first communication protocol PR1.

Preferably, according to the communication protocol PR1, the fixed TX length value TXL of the TX data packets and the fixed RX length value RXL of the RX data packets could be equal or different.

In FIG. 2, examples of data packets transmitted according to the Aurora™ communication protocol are shown. A TX data packet transmitted by the master device 101 has a fixed TX length value TXL=10 (bytes) whereas a RX data packet transmitted by the slave devices 102 have a fixed RX length value RXL=8 (bytes).

Another of said specific features consists in that TX data packets provided according to the communication protocol PR1 include at least a predefined byte (e.g. the second byte b1, normally referred to as "function byte") having a numeric value B comprised in a predefined first set of values T1 characteristic of the communication protocol PR1.

As an example, TX data packets transmitted by the master device 101, according to the Aurora™ communication protocol, have the second byte b1 with a numeric value equal or higher than 50 (T1={50 . . . 255}).

Another of said specific features consists in that data packets (TX or RX) provided according to the communication protocol PR1 are separated by a variable time delay, when they are transmitted by the master device 101 or by the slave devices 102.

Thus, a time interval having a variable time delay value TD separates subsequent data packets transmitted by the master device 101 or by the slave devices 102 according to the first communication protocol PR1.

According to the invention, data packets travelling over the communication bus 20, which are provided according to the second communication protocol PR2, have a second structure, which is different from the structure foreseen by the communication protocol PR1, and include specific features in accordance with the communication protocol PR2.

One of said specific features consists in that data packets provided according to the communication protocol PR2 have a variable length, when they are transmitted by the master device 101 or by the slave devices 102.

Thus, TX data packets or RX data packets, when transmitted according to the second communication protocol PR2, have TX length values TXL and RX length values RXL that may vary each time.

In FIG. 2, an example of a data packet transmitted according to the Modbus™ communication protocol are shown. TX data packets transmitted by the master device 101 and RX data packets (in particular the payload portion S1 of said data packets) have a variable length L, which is typically higher than 4 bytes.

Another of said specific features consists in that data packets (TX or RX) provided according to the communication protocol PR2 include at least a predefined byte (e.g. the second byte b1) having a numeric value B comprised in a predefined second set of values T2 characteristic of the communication protocol PR2 and completely different than the above-mentioned first predefined set of values T1 characteristic of the communication protocol PR1.

As an example, data packets (TX or RX) transmitted by the master device 101, according to the Modbus™ communication protocol, have the second byte b1 with a numeric value lower than 50 (T2={0 . . . 49}).

Preferably, the above-mentioned first and second set of values T1, T2 characteristic of the communication protocols PR1, PR2 have no values in common (in other words, the intersection between said sets of values is void).

Another of said specific features consists in that data packets (TX or RX) provided according to the communication protocol PR2 are separated by a minimum time delay, when they are transmitted by the master device 101 or by the slave devices 102.

Thus, subsequent data packets are separated by a time interval longer or equal to a characteristic minimum time delay value TDmin, when they are transmitted by the master device 101 or by the slave devices 102 according to the second communication protocol PR2.

The method 1, according to the invention, is particularly suitable for being implemented by a slave device 102.

In fact, the method 1 allows a slave device 102 to recognise whether the data packets travelling over the communication bus 20 are transmitted (by the master device 101 or by further slave devices 102) according to the first communication protocol PR1 or according to the second communication protocol PR2 with an extremely low probability of error (typically lower than 0.1%) by suitably processing at most few data packets travelling over the communication bus 2.

In this way, a slave device 102, for example a slave device just installed and connected to the communication bus 20, can immediately recognise the communication protocol used in the communication bus 20 and dynamically select the more appropriate communication protocol to communicate with other devices, in particular with the master device 101.

As an example, a slave device 102 can recognise the communication protocol used in the communication bus 20 and switch from the communication protocol Aurora™ to the communication protocol Modbus™, or vice-versa, for operation, according to the communication protocol used in said communication bus.

On the other hand, a slave device 102 connected to the communication 20 can immediately recognise whether the master device 101 has changed the communication protocol used to communicate over the communication channel 20 and dynamically change its communication protocol accordingly.

As an example, a slave device 102 can recognise whether a new communication protocol is used by the master device 101 and switch from the communication protocol Aurora™ to the communication protocol Modbus™, or vice-versa, for operation, according to said new communication protocol.

The method 1, according to the invention, is now described in details.

An important characteristic of the method 1 consists in that it comprises at least a CRC check procedure for processing a data packet travelling over the communication bus 20.

Said CRC check procedure comprises the following steps:
calculating a first checksum string CKS1 by processing the payload portion S1 of a data packet, according to a first CRC-generation engine associated to the communication protocol PR1;
calculating a second checksum string CKS2 by processing the payload portion S1 of said data packet, according to a second CRC-generation engine associated to the communication protocol PR2;
comparing the first and second checksum strings CKS1, CKS2 with the CRC portion S2 of said data packet.

The above-mentioned CRC check procedure provides for processing the payload portion S1 of a data packet according to different CRC algorithms associated to the first and second communication protocols PR1 and PR2 and provides for comparing the results so obtained with the actual content of the CRC portion S2 of the said data packet.

The first and second CRC-generation engines may conveniently include CRC calculation algorithms characteristic of the first and second communication protocols PR1, PR2 respectively.

In general, these algorithms are based on a so-called cyclic redundancy check polynomial generator that provides an amplification error of any bit different in the message in a way to reduce the probability of mistakes in which a wrong message is considered as valid.

As an example, the first CRC-generation engine may comprise CRC-CCITT-X25 algorithms based on the generator polynomial $x^{16}+x^{12}+x^5+1$, if the communication protocol PR1 is an Aurora™ communication protocol.

As a further example, the second CRC-generation engine may comprise CRC-16 algorithms based on the generator polynomial $x^{16}+x^{15}+x^2+1$, if the communication protocol PR2 is a Modbus™ communication protocol.

The above-mentioned CRC check procedure allows recognising the communication protocol, according to which a data packet is transmitted (by the master device 101 or by the slave devices 102) if the CRC portion S2 of said data packet is equal to only one of the calculated checksum strings CKS1, CKS2.

If the CRC portion S2 of said data packet is equal to the calculated checksum string CKS1 and different from the calculated checksum string CKS2, the communication protocol of said data packet is the communication protocol PR1.

If the CRC portion S2 of said data packet is equal to the calculated checksum string CKS2 and different from the calculated checksum string CKS1, the communication protocol of said data packet is the communication protocol PR2.

Conveniently, the method 1 provides for combining the above CRC check procedure with one or more further check procedures to process a first data packet M1 and, if necessary, a subsequent second data packet M2 travelling over the communication bus 20.

In principle, the data packets M1, M2 may be TX data packets (i.e. transmitted by the master device 101) or RX data packets (i.e. transmitted by a slave device 102) and it may have been transmitted according to the protocol PR1 or according to the protocol PR2.

According to an embodiment of the invention, the method 1 comprises the step 11 of receiving a first data packet M1 travelling over the communication bus 20.

According to said embodiment of the invention, the method 1 then comprises at least one of the following steps:
a step 12 of checking the structure of the received data packet M1;
a step 13 of executing a first CRC check procedure PCRC1 to process the received data packet M1.

In general, the above-mentioned steps 12-13 to process the received data packet M1 can be scrambled according to the needs to fit technical requirements linked to a specific implementation of the method of the invention.

However, the above-mentioned steps 12-13 to process the received data packet M1 are preferably executed according to a specific logic order that has proven to improve the efficiency in the recognition process of the communication protocol according to which the data packet M1 is transmitted.

The method 1 thus preferably comprises the following steps (FIG. 3):
the step 12 of checking the structure of the received data packet M1;
the step 13 of executing a first CRC check procedure PCRC1 to process the received data packet M1, if it is not possible to recognise the communication protocol used to provide the data packets travelling over the communication channel 20 by checking the structure of the data packet M1.

Conveniently, if it is possible to recognise the communication protocol used to provide the data packets travelling over the communication channel 20 by checking the structure of the data packet M1, the method 1 is terminated before the step 13 of executing the first CRC check procedure PCRC1 to process the received data packet M1.

Preferably, the above-mentioned step 12 of checking the structure of the received data packet M1 comprises a first length check procedure PL1 that provides for executing a check of the length of the data packet M1.

Preferably, the length check procedure PL1 comprises the following steps:
acquiring a length value L1 indicative of the length of the data packet M1, e.g. by counting the bytes of said data packet;
comparing the length value L1 of the data packet M1 with the fixed TX length value TXL and the fixed RX length value RXL characteristic of the first communication protocol PR1.

Preferably, in addition or in alternative to the length check procedure PL1, the above-mentioned step 12 of checking the structure of the received data packet M1 comprises a first byte check procedure PB1 comprising the following steps:
- acquiring at least a numeric value of at least a predefined byte of the data packet M1;
- comparing the acquired at least a numeric value with first and second sets of values T1, T2, which are characteristic of the communication protocols PR1, PR2, respectively.

In general, the byte check procedure PB1 may provide for checking the numeric values in one or more predefined byte positions of the data packet M1.

Preferably, however, the byte check procedure PB1 provides for executing a check of a numeric value included in the second byte b1 of the data packet M1.

Preferably, the byte check procedure PB1 comprises the following steps:
- acquiring a numeric value B included in the second byte b1 of the data packet M1;
- comparing the acquired numeric value B with the first set of values T1 characteristic of the first communication protocols PR1 and with the second set of values T2 characteristic of the second communication protocols PR2.

In general, the above-mentioned length check procedure PL1 and byte check procedure PB1 to process the received data packet M1 can be scrambled according to the needs to fit technical requirements linked to a specific implementation of the method of the invention.

However, the above-mentioned check procedures PL1, PB1 are preferably executed according to a specific logic order that has proven to improve the efficiency in the recognition process of the communication protocol according to which the data packet M1 is transmitted.

The step 12 of checking the structure of the received data packet M1 thus preferably comprises:
- executing the length check procedure PL1;
- executing the byte check procedure PB1, if it is not possible to recognise the communication protocol used to provide the data packets travelling over the communication channel 20 by means of the length check procedure PL1.

Conveniently, if it is possible to recognise the communication protocol used to provide the data packets travelling over the communication channel 20 by means of the length check procedure PL2, the method 1 is terminated before the execution of the byte check procedure PB2.

The length check procedure PL1 allows recognising that the data packet M1 is transmitted (by the master device 101 or by the slave devices 102) according to the communication protocol PR2 if the length value L1 is different from both the fixed length values TXL and RXL, as such a condition allows excluding the communication protocol PR1.

As an example, if the length value L1 is different from 8 or 10 bytes, the data packet M1 cannot be transmitted according to the Aurora™ communication protocol and it is certainly a data packet transmitted according to the Modbus™ communication protocol.

Instead, the length check procedure PL1 does not allow recognising the communication protocol of the data packet M1 if the length value L1 is equal to the fixed length value TXL or is equal to the fixed length value RXL, as these alternative conditions do not allow excluding one of the communication protocols PR1, PR2.

In fact, a data packet M1 having length L1=TXL may be a TX data packet transmitted by the master device 101 according to the communication protocol PR1 or a generic data packet transmitted according to the communication protocol PR2.

On the other hand, a data packet M1 having length L1=RXL may be a RX data packet transmitted by a slave device 102, according to the communication protocol PR1, or a generic data packet transmitted according to the communication protocol PR2.

As an example, if the length value L1 is equal to 8 or 10 bytes, the data packet M1 may be equally transmitted according to the Aurora™ communication protocol or according to the Modbus™ communication protocol.

The byte check procedure PB1 allows recognising the communication protocol of the data packet M1 if the data packet M1 has a length L1=TXL.

In this case, in fact, the data packet M1 is certainly a TX data packet transmitted by the master device 101 according to the communication protocol PR1 or a TX or RX data packet transmitted according to the communication protocol PR2.

Therefore, the data packet M1 (having length L1=TXL) is a TX data packet transmitted according to the communication protocol PR1 if the acquired numeric value B of the second byte b1 is included in the set of values T1 and is not included in the set of values T2 whereas it is a TX or RX data packet transmitted according to the communication protocol PR2 if the acquired numeric value B of the second byte b1 is included in the set of values T2 and is not included in the set of values T1.

As an example, a data packet M1 having a length value L1=10 bytes and a numeric value B=55 in the second byte b1, is a TX data packet transmitted according to the Aurora™ communication protocol.

As a further example, a data packet M1 having a length value L1=10 bytes and a numeric value B=45 in the second byte b1, is a TX or RX data packet transmitted according to the Modbus™ communication protocol.

Instead, if the data packet M1 has a length L1=RXL, the byte check procedure PB1 does not allow recognising the communication protocol of the data packet M1.

In fact, this condition does not allow excluding one of the communication protocols PR1, PR2 even if the data packet M1 is processed by means of the byte check procedure PB1.

In view of the above, it is evident that, in general, the step 12 of checking the structure of the data packet M1 does not allow to recognise the communication protocol used to provide the data packets travelling over the communication channel 20 if the data packet M1 has a length L1=RXL.

In this case, the step 13 of executing the first CRC check procedure PCRC1 to process the received data packet M1 needs to be executed. Otherwise, the method 1 is conveniently terminated as explained above.

Preferably, the first CRC check procedure PCRC1 for processing the payload portion S1 of the data packet M1 according to different CRC algorithms associated to the first and second communication protocols PR1 and PR2 and provides for comparing the results so obtained with the actual content of the CRC portion S2 of the data packet M1.

According to the invention, the CRC check procedure PCRC1 comprises the following steps;
- calculating a first checksum string CKS1 by processing the payload portion S1 of the first data packet M1, according to a first CRC-generation engine associated to the first communication protocol PR1;
- calculating a second checksum string CKS2 by processing the payload portion S1 of the first data packet M1, according to a second CRC-generation engine associated to the second master-slave communication protocol PR2;

comparing with the first and second checksum strings CKS1, CKS2 with the CRC portion S2 of the first data packet M1.

As explained above, the first and second CRC-generation engines conveniently include CRC calculation algorithms characteristic of the first and second communication protocols PR1, PR2 respectively.

The CRC check procedure PCRC1 allows recognising the communication protocol, according to which the data packet M1 is transmitted (by the master device 101 or by the slave devices 102) if the CRC portion S2 of the data packet M1 is equal to only one of the calculated checksum strings CKS1, CKS2.

If the CRC portion S2 of the data packet M1 is equal to the calculated checksum string CKS1 and different from the calculated checksum string CKS2, the communication protocol of the data packet M1 is the communication protocol PR1.

If the CRC portion S2 of the data packet M1 is equal to the calculated checksum string CKS2 and different from the calculated checksum string CKS1, the communication protocol of the data packet M1 is the communication protocol PR2.

In general, the CRC check procedure PCRC1 allows recognising the communication protocol of the data packet M1 with a high probability of success, typically estimated in the order of 99,97%.

If it is possible to recognise the communication protocol used to provide the data packets travelling over the communication channel 20 by means of the above-described steps 12 and 13, the method 1 is conveniently terminated.

However, due to the huge amount of data packets travelling over the communication channel 20, it may occur that the above describe processing of the CRC portion S2 of the data packet M1 provides identical checksum strings CSK1, CSK2, thereby making it impossible to recognise the communication protocol used to transmit the data packet M1.

Preferably, the method 1 provide some additional steps 14, 15, 16, 17 if it is not possible to recognise the communication protocol used to provide the data packets travelling over the communication channel 20 by means of the above-described steps 12 and 13.

Preferably, in this case, the method 1 comprises a step 14 of receiving a second data packet M2 travelling over the communication bus 20.

In principle, also the data packet M2 may be a TX data packet (i.e. transmitted by the master device 101) or a RX data packet (i.e. transmitted by a slave device 102) and it may have been transmitted according to the protocol PR1 or according to the protocol PR2.

Preferably, the method 1 comprises a step 15 of executing a time delay check procedure PTD to process the data packets M1, M2.

The time delay check procedure PTD provides for analysing the time relationship between the data packets M1, M2 and it comprises at least a check of a time delay between the data packets M1, M2.

Preferably, the time delay check procedure PTD comprises the following steps:
acquiring a time delay value TD between the data packets M1, M2;
comparing the acquired time delay value TD with a minimum time delay value $TD_{MIN}$, which is characteristic of the second protocol PR2.

The time delay check procedure PTD allows recognising that the data packets M1, M2 are transmitted (by the master device 101 or by the slave devices 102) according to the communication protocol PR1 if the time delay value TD is lower than the minimum time delay value $TD_{MIN}$, as such a condition allows excluding the communication protocol PR2.

As an example, if the time delay value TD<3.5 char, the data packets M1, M2 cannot be transmitted according to the Modbus™ communication protocol and they are certainly data packets transmitted according to the Aurora™ communication protocol.

Instead, the time delay check procedure PTD does not allow recognising the communication protocol of the data packets M1, M2 if the time delay value TD is higher than the minimum time delay value $TD_{MIN}$, as such a condition does not allow excluding one of the communication protocols PR1, PR2.

In fact, if they are separated by a time delay TD higher than the minimum time delay characteristic of the second communication protocol, the data packets M1, M2 may have been transmitted according to the first communication protocols PR1 or PR2, indifferently.

As an example, if the time delay value TD>3.5 char, the data packet M1, M2 may be equally transmitted according to the Aurora™ communication protocol or according to the Modbus™ communication protocol.

If it is possible to recognise the communication protocol used to provide the data packets travelling over the communication channel 20 by means of the above-described time delay check procedure PTD, the method 1 is conveniently terminated.

If it is not possible to recognise the communication protocol used to provide the data packets travelling over the communication channel 20 by means of the above-described time delay check procedure PTD, the method 1 provides for processing the second data packet M2 according to a sequence of steps similar to the one described for processing the data packet M1.

Preferably, the method 1 then comprises at least one of the following steps:
a step 16 of checking the structure of the received data packet M2;
a step 17 of executing a second CRC check procedure PCRC2 to process the received data packet M2.

In general, the above-mentioned steps 16-17 to process the received data packet M2 can be scrambled according to the needs to fit technical requirements linked to a specific implementation of the method of the invention.

However, the above-mentioned steps 16-17 to process the received data packet M2 are preferably executed according to a specific logic order that has proven to improve the efficiency in the recognition process of the communication protocol according to which the data packet M1 is transmitted.

The method 1 thus preferably comprises the following steps (FIG. 3):
the step 16 of checking the structure of the received data packet M1;
the step 17 of executing a second CRC check procedure PCRC2 to process the received data packet M2, if it is not possible to recognise the communication protocol used to provide the data packets travelling over the communication channel 20 by checking the structure of the data packet M2.

Conveniently, if it is possible to recognise the communication protocol used to provide the data packets travelling over the communication channel 20 by checking the structure of the data packet M2, the method 1 is terminated before the step 17 of executing a first CRC check procedure PCRC2 to process the received data packet M2.

Preferably, the above-mentioned step 16 of checking the structure of the received data packet M2 comprises a second length check procedure PL2 that provides for executing a check of the length of the data packet M2.

Preferably, the length check procedure PL2 comprises the following steps:
- acquiring a length value L2 indicative of the length of the data packet M2, e.g. by counting the bytes of said data packet;
- comparing the length value L2 of the data packet M2 with the fixed TX length value TXL and the fixed RX length value RXL characteristic of the first communication protocol PR1.

Preferably, in addition or in alternative to the length check procedure PL2, the above-mentioned step 16 of checking the structure of the received data packet M2 comprises a second byte check procedure PB2 comprising the following steps:
- acquiring at least a numeric value of at least a predefined byte of the data packet M2;
- comparing the acquired at least a numeric value with first and second sets of values T1, T2, which are characteristic of the communication protocols PR1, PR2, respectively.

In general, the byte check procedure PB2 may provide for checking the numeric values in one or more predefined byte positions of the data packet M2.

Preferably, however, the byte check procedure PB2 provides for executing a check of a numeric value included in the second byte b1 of the data packet M2.

Preferably, the byte check procedure PB2 comprises the following steps:
- acquiring a numeric value B included in the second byte b1 of the data packet M2;
- comparing the acquired numeric value B with the first set of values T1 characteristic of the first communication protocols PR1 and with the second set of values T2 characteristic of the second communication protocols PR2.

In general, the above-mentioned length check procedure PL2 and byte check procedure PB2 to process the received data packet M2 can be scrambled according to the needs to fit technical requirements linked to a specific implementation of the method of the invention.

However, the above-mentioned check procedures PL2, PB2 are preferably executed according to a specific logic order that has proven to improve the efficiency in the recognition process of the communication protocol according to which the data packet M2 is transmitted.

The step 16 of checking the structure of the received data packet M2 thus preferably comprises:
- executing the length check procedure PL2;
- executing the byte check procedure PB2, if it is not possible to recognise the communication protocol used to provide the data packets travelling over the communication channel 20 by means of the length check procedure PL2.

Conveniently, if it is possible to recognise the communication protocol used to provide the data packets travelling over the communication channel 20 by means of the length check procedure PL2, the method 1 is terminated before the execution of the byte check procedure PB2.

The length check procedure PL2 allows recognising that the data packet M2 is transmitted (by the master device 101 or by the slave devices 102) according to the communication protocol PR2 if the length value L2 is different from both the fixed length values TXL and RXL, as such a condition allows excluding the communication protocol PR1.

As an example, if the length value L2 is different from 8 or 10 bytes, the data packet M1 cannot be transmitted according to the Aurora™ communication protocol and it is certainly a data packet transmitted according to the Modbus™ communication protocol.

Instead, the length check procedure PL2 does not allow recognising the communication protocol of the data packet M2 if the length value L2 is equal to the fixed length value TXL or is equal to the fixed length value RXL, as these alternative conditions do not allow excluding one of the communication protocols PR1, PR2.

In fact, a data packet M2 having length L2=TXL may be a TX data packet transmitted by the master device 101 according to the communication protocol PR1 or a generic data packet transmitted according to the communication protocol PR2.

On the other hand, a data packet M2 having length L2=RXL may be a RX data packet transmitted by a slave device 102, according to the communication protocol PR1, or a generic data packet transmitted according to the communication protocol PR2.

As an example, if the length value L1 is equal to 8 or 10 bytes, the data packet M2 may be equally transmitted according to the Aurora™ communication protocol or according to the Modbus™ communication protocol.

The byte check procedure PB1 allows recognising the communication protocol of the data packet M2 if the data packet M1 has a length L2=TXL.

In this case, in fact, the data packet M2 is certainly a TX data packet transmitted by the master device 101 according to the communication protocol PR1 or a TX or RX data packet transmitted according to the communication protocol PR2.

Therefore, the data packet M2 (having length L1=TXL) is a TX data packet transmitted according to the communication protocol PR1 if the acquired numeric value B of the second byte b1 is included in the set of values T1 and is not included in the set of values T2 whereas it is a TX or RX data packet transmitted according to the communication protocol PR2 if the acquired numeric value B of the second byte b1 is included in the set of values T2 and is not included in the set of values T1.

As an example, a data packet M2 having a length value L1=10 bytes and a numeric value B=55 in the second byte b1, is a TX data packet transmitted according to the Aurora™ communication protocol.

As a further example, a data packet M2 having a length value L1=10 bytes and a numeric value B=45 in the second byte b1, is a TX or RX data packet transmitted according to the Modbus™ communication protocol.

Instead, if the data packet M2 has a length L1=RXL, the byte check procedure PB2 does not allow recognising the communication protocol of the data packet M2. In fact, this condition does not allow excluding one of the communication protocols PR1, PR2 even if the data packet M2 is processed by means of the byte check procedure PB1.

In view of the above, it is evident that, in general, the step 16 of checking the structure of the data packet M2 does not allow to recognise the communication protocol used to provide the data packets travelling over the communication channel 20 if the data packet M1 has a length L1=RXL.

In this case, the step 17 of executing the second CRC check procedure PCRC2 to process the received data packet M2 needs to be executed. Otherwise, the method 1 is conveniently terminated as explained above.

Preferably, the second CRC check procedure PCRC2 for processing the payload portion S1 of the data packet M2 according to different CRC algorithms associated to the first and second communication protocols PR1 and PR2 and provides for comparing the results so obtained with the actual content of the CRC portion S2 of the data packet M2.

According to the invention, the CRC check procedure PCRC2 comprises the following steps;
- calculating a first checksum string CKS1 by processing the payload portion S1 of the first data packet M2, according to a first CRC-generation engine associated to the first communication protocol PR1;
- calculating a second checksum string CKS2 by processing the payload portion S1 of the first data packet M2, according to a second CRC-generation engine associated to the second master-slave communication protocol PR2;
- comparing with the first and second checksum strings CKS1, CKS2 with the CRC portion S2 of the first data packet M2.

As explained above, the first and second CRC-generation engines conveniently include CRC calculation algorithms characteristic of the first and second communication protocols PR1, PR2 respectively.

The CRC check procedure PCRC2 allows recognising the communication protocol, according to which the data packet M2 is transmitted (by the master device 101 or by the slave devices 102) if the CRC portion S2 of the data packet M2 is equal to only one of the calculated checksum strings CKS1, CKS2.

If the CRC portion S2 of the data packet M2 is equal to the calculated checksum string CKS1 and different from the calculated checksum string CKS2, the communication protocol of the data packet M2 is the communication protocol PR1.

If the CRC portion S2 of the data packet M2 is equal to the calculated checksum string CKS2 and different from the calculated checksum string CKS1, the communication protocol of the data packet M2 is the communication protocol PR2.

In general, the CRC check procedure PCRC2 allows recognising the communication protocol of the data packet M2 with a high probability of success, typically estimated in the order of 99.97%.

However, at this point of its overall execution, the method 1 allows recognising the communication protocol of the data packets M1 or M2 with a very high probability of success.

For this reason, the method 1 is preferably terminated after the execution of the above-described CRC check procedure PCRC2.

In case of need, the method 1 may however be repeated for further data packets M3, M4, . . . and so on, which may not be necessarily received subsequently to the data packets M1, M2.

The method 1 may thus be repeated at subsequent time instants or at time instants separated by a given time interval, according to the needs.

The method 1, according to the invention, is particularly suitable for being implemented by signal processing resources 102A (e.g. including a microprocessor) capable of storing and executing software instructions to carry out said method.

In a further aspect, the present invention thus relates to a computer program stored or storable in a storage medium, which comprises software instructions to execute the method 1, according to the invention.

Preferably, the signal processing resources 102A for implementing the method 1, according to the invention, are included in one or more slave devices 102 operatively associated with the communication channel 20.

The method 1, according to the invention, can be implemented in a generic industrial plant having one or more slave devices in communication with a master device through a communication channel.

The method 1, according to the invention, is particularly suitable for implementation in a photovoltaic plant 100 comprising one or more field devices 102 operatively coupled to a remote computerised device 101 through a communication bus 20.

Conveniently, the one or more field devices 102 are configured to operate as slave devices whereas the remote computerised device 101 is configured to operate as a master device.

Preferably, the field devices 102 of the photovoltaic plant 100 comprise the electronic controllers on-board the photovoltaic inverter of said photovoltaic plant.

However, the field devices 102 of the photovoltaic plant 100 could include other electronic devices, such as sensors, protection devices, meters, actuators, weather stations, and so on.

The remote computerised device 101 may comprise, for example, a data logger, a gateway, a remote controller, a computer server, and so on.

Preferably, the field devices 102 are configured to execute the method 1, according to the invention.

To this aim, the field devices 102 may conveniently comprise signal processing resources 102A (e.g. including a microprocessor) capable of storing and executing software instructions to carry out the method 1 according to the invention.

The method 1, according to the invention, is also suitable for implementation in an electric vehicle (EV) charger plant 100 comprising one or more field devices 102 operatively coupled to a remote computerised device 101 through a communication bus 20.

Conveniently, the one or more field devices 102 are configured to operate as slave devices whereas the remote computerised device 101 is configured to operate as a master device.

Preferably, the field devices 102 of the EV charger plant 100 comprise the electronic controllers on-board the EV charger stations of said EV charger plant.

However, the field devices 102 of the EV charger plant 100 could include other electronic devices, such as sensors, protection devices, and so on.

The remote computerised device 101 may comprise, for example, a supervising controller, a computer server, and so on.

Preferably, the field devices 102 are configured to execute the method 1, according to the invention.

To this aim, the field devices 102 may conveniently comprise signal processing resources 102A (e.g. including a microprocessor) capable of storing and executing software instructions to carry out the method 1 according to the invention.

The method 1, according to the present invention, is quite effective in solving or mitigating the above-evidenced drawbacks of the state of the art.

The method 1, according to the invention, allows a slave device 102 (e.g. a field device of a photovoltaic plant or EV charger plant) to automatically recognise the communication protocol used in the communication bus 20 and dynamically select the more appropriate communication protocol to communicate with other devices, in particular with the master device 101 (e.g. a data logger collecting data from the photovoltaic plant or a supervising controller collecting data from the EV charger plant).

On the other hand, the implementation of the method 1 by the slave devices 102 allows the master device 101 to carry out suitable scouting procedures to facilitate the recognition of the protocol used in the communication bus 20 by the slave device.

Such scouting procedures may, for example, include the transmission at predefined time intervals of suitable sequences of predefined messages to all the addresses available for the slave devices 102 in order to ensure an automatic tuning of the communication protocol used by said slave devices, particularly by possible newly installed slave devices.

The method 1, according to the present invention, is quite effective in improving the management of a network of slave devices communicating with a master device with a consequent reduction of the overall operative costs.

The method 1, according to the present invention, allows automatically solving possible protocol communication conflicts without the need of carrying out time consuming and expensive set-up sessions to properly configure the slave devices 102, according to the needs.

The method 1, according to the invention, is particularly adapted for being digitally implemented by computer resources that can be installed on board the slave devices 102.

The method 1, according to the invention, is thus of relatively easy and cost-effective practical implementation.

The invention claimed is:

1. A method for recognising a communication protocol of data packets (M1, M2) travelling over a communication bus, said data packets being provided according to a first communication protocol (PR1) or according to a second communication protocol (PR2) and including at least a payload portion (S1) and a CRC portion (S2), wherein it comprises a CRC check procedure (PCRC1, PCRC2) for processing a data packet (M1, M2) travelling over said communication bus, said CRC check procedure comprising:
   calculating a first checksum string (CKS1) by processing the payload portion (S1) of said data packet, according to a first CRC-generation engine associated to said first communication protocol (PR1);
   calculating a second checksum string (CKS2) by processing the payload portion (S1) of said data packet, according to a second CRC-generation engine associated to said second communication protocol (PR2);
   comparing with said first and second checksum strings (CKS1, CKS2) with the CRC portion (S2) of said data packet;
   receiving a second data packet (M2) travelling over said communication bus, said second data packet being subsequent to said first data packet (M1); and
   executing a time delay check procedure (PTD) comprising the following steps:
      acquiring a time delay value (TD) between said first and second data packets (M1, M2), and
      comparing said time delay value (TD) with a minimum time delay value ($TD_{MIN}$) characteristic of said second protocol (PR2).

2. The method, according to claim 1, wherein it comprises the following steps:
   receiving a first data packet (M1) travelling over said communication bus;
   executing at least one of the following steps:
      checking the structure of said first data packet (M1);
      executing a first CRC check procedure (PCRC1) comprising:
         calculating a first checksum string (CKS1) by processing the payload portion (S1) of said first data packet (M1), according to a first CRC-generation engine associated to said first communication protocol (PR1);
         calculating a second checksum string (CKS2) by processing the payload portion (S1) of said first data packet (M1), according to a second CRC-generation engine associated to said second communication protocol (PR2); and
         comparing with said first and second checksum strings (CKS1, CKS2) with the CRC portion (S2) of said first data packet (M1).

3. The method, according to claim 2, wherein said step of checking the structure of said first data packet (M1) comprises a first length check procedure (PL1) comprising the following steps:
   acquiring a length value (L1) indicative of the length of said first data packet (M1);
   comparing the acquired length value (L1) with a fixed TX length value (TXL) and a fixed RX length value (RXL) characteristic of said first communication protocol (PR1).

4. The method, according to claim 2, wherein said step of checking the structure of said first data packet (M1) comprises a first byte check procedure (PB1) comprising the following steps:
   acquiring at least a numeric value (B) of at least a predefined byte (b1) of said first data packet (M1);
   comparing the acquired at least a numeric value (B) with first and second sets of values (T1, T2) characteristic of said first and second communication protocols (PR1, PR2).

5. The method, according to claim 1, wherein it comprises the step of checking the structure of said second data packet (M2).

6. The method, according to claim 5, wherein said step of checking the structure of said second data packet (M2) includes a second length check procedure (PL2) comprising the following steps:
   acquiring a length value (L2) indicative of the length of said second data packet (M2); and
   comparing the acquired length value (L2) with a fixed TX length value (TXL) and a fixed RX length value (RXL) characteristic of said first communication protocol (PR1).

7. The method, according to claim 5, wherein said step of checking the structure of said second data packet (M2) includes a second byte check procedure (PB2) comprising the following steps:
   acquiring at least a numeric value (B) of at least a predefined byte (b1) of said second data packet (M2);
   comparing the acquired at least a numeric value (B) with first and second sets of values (T1, T2) characteristic of said first and second communication protocols (PR1, PR2).

8. The method, according to claim 1, wherein it comprises the step of executing a second CRC check procedure (PCRC2) comprising:
   calculating a first checksum string (CKS1) by processing at least the payload portion (S1) of said second data packet (M2), according to a first CRC-generation engine associated to said first communication protocol (PR1);

calculating a second checksum string (CKS2) by processing at least the payload portion (S1) of said second data packet (M2), according to a second CRC-generation engine associated to said second communication protocol (PR2); and comparing with said first and second checksum strings (CKS1, CKS2) with the CRC portion (S2) of said second data packet (M2).

9. The method, according to claim 1, wherein said first communication protocol (PR1) is an Aurora™ communication protocol or a related legacy protocol.

10. The method, according to claim 1, wherein said second communication protocol (PR2) is a Modbus™ communication protocol or a related legacy protocol.

11. A non-transitory computer readable medium comprising:
a set of instructions stored on the storage medium structured to be executable by a processor and effective to cause the processor to:
receive data packets being provided from a communication bus according to a first communication protocol or according to a second communication protocol, the data packets including at least a payload portion and a CRC portion,
calculate a first checksum string by processing the payload portion of said data packet, according to a first CRC-generation engine associated to said first communication protocol,
calculate a second checksum string by processing the payload portion of said data packet, according to a second CRC-generation engine associated to said second communication protocol,
determine whether the data packet was sent using the first communication protocol or the second communication protocol by comparing said first and second checksum strings with the CRC portion of said data packet,
receive a second data packet travelling over said communication bus, said second data packet being subsequent to said first data packet, and
execute a time delay check procedure comprising the following steps:
acquire a time delay value between said first and second data packets, and
compare said time delay value with a minimum time delay value characteristic of said second protocol.

12. A field device for a plant, said field device being operatively coupleable with a remote computerised device through a communication bus, said field device being configured to operate as a slave device, said remote computerised device being configured to operate as a master device, wherein it is configured to execute instructions for recognising a communication protocol of data packets (M1, M2) travelling over a communication bus, the data packets being provided according to a first communication protocol (PR1) or according to a second communication protocol (PR2) and including at least a payload portion (S1) and a CRC portion (S2), wherein it comprises a CRC check procedure (PCRC1, PCRC2) for processing a data packet (M1, M2) travelling over said communication bus, comprising to:
calculate a first checksum string (CKS1) by processing the payload portion (S1) of said data packet, according to a first CRC-generation engine associated to said first communication protocol (PR1);
calculate a second checksum string (CKS2) by processing the payload portion (S1) of said data packet, according to a second CRC-generation engine associated to said second communication protocol (PR2); and
compare with said first and second checksum strings (CKS1, CKS2) with the CRC portion (S2) of said data packet;
receive a second data packet (M2) travelling over said communication bus, said second data packet being subsequent to said first data packet (M1); and
execute a time delay check procedure (PTD) comprising the following steps:
acquire a time delay value (TD) between said first and second data packets (M1, M2), and
compare said time delay value (TD) with a minimum time delay value ($TD_{MIN}$) characteristic of said second protocol (PR2).

13. The field device, according to claim 12, wherein it is a controller for a photovoltaic inverter or a controller for an electric vehicle charger station.

14. A plant comprising one or more field devices operatively coupled with a remote computerised device through a communication bus, said one or more field devices being configured to operate as slave devices, said remote computerised device being configured to operate as a master device, wherein said one or more field devices are configured to execute instructions for recognising a communication protocol of data packets (M1, M2) travelling over a communication bus, the data packets being provided according to a first communication protocol (PR1) or according to a second communication protocol (PR2) and including at least a payload portion (S1) and a CRC portion (S2), wherein it comprises a CRC check procedure (PCRC1, PCRC2) for processing a data packet (M1, M2) travelling over said communication bus, comprising to:
calculate a first checksum string (CKS1) by processing the payload portion (S1) of said data packet, according to a first CRC-generation engine associated to said first communication protocol (PR1);
calculate a second checksum string (CKS2) by processing the payload portion (S1) of said data packet, according to a second CRC-generation engine associated to said second communication protocol (PR2); and
compare with said first and second checksum strings (CKS1, CKS2) with the CRC portion (S2) of said data packet;
receive a second data packet (M2) travelling over said communication bus, said second data packet being subsequent to said first data packet (M1); and
execute a time delay check procedure (PTD) comprising the following steps:
acquire a time delay value (TD) between said first and second data packets (M1, M2), and
compare said time delay value (TD) with a minimum time delay value ($TD_{MIN}$) characteristic of said second protocol (PR2).

15. The plant, according to claim 14, wherein it is a photovoltaic plant or an electric vehicle charger plant.

16. The method, according to claim 3, wherein said step of checking the structure of said first data packet (M1) comprises a first byte check procedure (PB1) comprising the following steps:
acquiring at least a numeric value (B) of at least a predefined byte (b1) of said first data packet (M1);

comparing the acquired at least a numeric value (B) with first and second sets of values (T1, T2) characteristic of said first and second communication protocols (PR1, PR2).

17. The method, according to claim 1, wherein it comprises the step of checking the structure of said second data packet (M2).

18. The method, according to claim 5, wherein said step of checking the structure of said second data packet (M2) includes a second length check procedure (PL2) comprising the following steps:
    acquiring a length value (L2) indicative of the length of said second data packet (M2); and
    comparing the acquired length value (L2) with a fixed TX length value (TXL) and a fixed RX length value (RXL) characteristic of said first communication protocol (PR1).

19. A method for recognising a communication protocol of data packets (M1, M2) travelling over a communication bus, said data packets being provided according to a first communication protocol (PR1) or according to a second communication protocol (PR2) and including at least a payload portion (S1) and a CRC portion (S2), wherein it comprises a CRC check procedure (PCRC1, PCRC2) for processing a data packet (M1, M2) travelling over said communication bus, said CRC check procedure comprising:
    receiving a first data packet (M1) travelling over said communication bus;
    executing at least one of the following steps:
        checking the structure of said first data packet (M1), and
        executing a first CRC check procedure (PCRC1) comprising:
            calculating a first checksum string (CKS1) by processing the payload portion (S1) of said first data packet (M1), according to a first CRC-generation engine associated to said first communication protocol (PR1),
            calculating a second checksum string (CKS2) by processing the payload portion (S1) of said first data packet (M1), according to a second CRC-generation engine associated to said second communication protocol (PR2), and
            comparing with said first and second checksum strings (CKS1, CKS2) with the CRC portion (S2) of said first data packet (M1);
    receiving a second data packet (M2) travelling over said communication bus, said second data packet being subsequent to said first data packet (M1); and
    executing a time delay check procedure (PTD) comprising the following steps:
        acquiring a time delay value (TD) between said first and second data packets (M1, M2), and
        comparing said time delay value (TD) with a minimum time delay value ($TD_{MIN}$) characteristic of said second protocol (PR2).

20. A non-transitory computer readable medium comprising:
    a set of instructions stored on the storage medium structured to be executable by a processor and effective to cause the processor to:
    receive data packets being provided from a communication bus according to a first communication protocol (PR1) or according to a second communication protocol (PR2), the data packets including at least a payload portion and a CRC portion,
    receive a first data packet (M1) travelling over said communication bus;
    execute at least one of the following steps:
        check the structure of said first data packet (M1), and
        execute a first CRC check procedure (PCRC1) comprising:
            calculate a first checksum string (CKS1) by processing the payload portion (S1) of said first data packet (M1), according to a first CRC-generation engine associated to said first communication protocol (PR1),
            calculate a second checksum string (CKS2) by processing the payload portion (S1) of said first data packet (M1), according to a second CRC-generation engine associated to said second communication protocol (PR2), and
            compare with said first and second checksum strings (CKS1, CKS2) with the CRC portion (S2) of said first data packet (M1),
    receive a second data packet (M2) travelling over said communication bus, said second data packet being subsequent to said first data packet (M1), and
    execute a time delay check procedure (PTD) comprising the following steps:
        acquire a time delay value (TD) between said first and second data packets (M1, M2), and
        compare said time delay value (TD) with a minimum time delay value ($TD_{MIN}$) characteristic of said second protocol (PR2).

21. A plant comprising one or more field devices operatively coupled with a remote computerised device through a communication bus, said one or more field devices being configured to operate as slave devices, said remote computerised device being configured to operate as a master device, wherein said one or more field devices are configured to execute instructions for recognising a communication protocol of data packets (M1, M2) travelling over a communication bus, the data packets being provided according to a first communication protocol (PR1) or according to a second communication protocol (PR2) and including at least a payload portion (S1) and a CRC portion (S2), wherein it comprises a CRC check procedure (PCRC1, PCRC2) for processing a data packet (M1, M2) travelling over said communication bus, comprising to:
    receive a first data packet (M1) travelling over said communication bus,
    execute at least one of the following steps:
        check the structure of said first data packet (M1),
        execute a first CRC check procedure (PCRC1) comprising:
            calculate a first checksum string (CKS1) by processing the payload portion (S1) of said first data packet (M1), according to a first CRC-generation engine associated to said first communication protocol (PR1),
            calculate a second checksum string (CKS2) by processing the payload portion (S1) of said first data packet (M1), according to a second CRC-generation engine associated to said second communication protocol (PR2), and
            compare with said first and second checksum strings (CKS1, CKS2) with the CRC portion (S2) of said first data packet (M1),
    receive a second data packet (M2) travelling over said communication bus, said second data packet being subsequent to said first data packet (M1), and execute a time delay check procedure (PTD) comprising the following steps:
acquire a time delay value (TD) between said first and second data packets (M1, M2), and
compare said time delay value (TD) with a minimum time delay value (TD$_{MIN}$) characteristic of said second protocol (PR2).

22. A field device for a plant, said field device being operatively coupleable with a remote computerised device through a communication bus, said field device being configured to operate as a slave device, said remote computerised device being configured to operate as a master device, wherein it is configured to execute instructions for recognising a communication protocol of data packets (M1, M2) travelling over a communication bus, the data packets being provided according to a first communication protocol (PR1) or according to a second communication protocol (PR2) and including at least a payload portion (S1) and a CRC portion (S2), wherein it comprises a CRC check procedure (PCRC1, PCRC2) for processing a data packet (M1, M2) travelling over said communication bus, comprising to:
receive a first data packet (M1) travelling over said communication bus,
execute at least one of the following steps:
check the structure of said first data packet (M1),
execute a first CRC check procedure (PCRC1) comprising:
calculate a first checksum string (CKS1) by processing the payload portion (S1) of said first data packet (M1), according to a first CRC-generation engine associated to said first communication protocol (PR1),
calculate a second checksum string (CKS2) by processing the payload portion (S1) of said first data packet (M1), according to a second CRC-generation engine associated to said second communication protocol (PR2), and
compare with said first and second checksum strings (CKS1, CKS2) with the CRC portion (S2) of said first data packet (M1),
receive a second data packet (M2) travelling over said communication bus, said second data packet being subsequent to said first data packet (M1), and
execute a time delay check procedure (PTD) comprising the following steps:
acquire a time delay value (TD) between said first and second data packets (M1, M2), and
compare said time delay value (TD) with a minimum time delay value (TD$_{MIN}$) characteristic of said second protocol (PR2).

* * * * *